US006701675B1

(12) United States Patent
Ekker et al.

(10) Patent No.: US 6,701,675 B1
(45) Date of Patent: Mar. 9, 2004

(54) AUTOMATIC DOWNSPOUT SYSTEM

(76) Inventors: Jon D. Ekker, 11 N. 26th St., Billings, MT (US) 59101; Frank H. Nienaber, 2715 Wyoming Ave., Billings, MT (US) 59102

(*) Notice: Subject to any disclaimer, the term of this patent is extended or adjusted under 35 U.S.C. 154(b) by 0 days.

(21) Appl. No.: 10/305,585

(22) Filed: Nov. 26, 2002

(51) Int. Cl.[7] .............................................. E04D 13/08
(52) U.S. Cl. .......................................... 52/16; 137/615
(58) Field of Search ............................ 52/16; 137/579, 137/615

(56) References Cited

U.S. PATENT DOCUMENTS

| | | | |
|---|---|---|---|
| 3,060,952 A | * 10/1962 | Bystrom | 137/67 |
| 3,316,928 A | 5/1967 | Weakley | 137/119 |
| 3,375,851 A | * 4/1968 | Henry et al. | 137/396 |
| 3,911,954 A | 10/1975 | Johnson | 137/615 |
| 4,270,572 A | 6/1981 | Jarzynka | 137/615 |
| 5,014,745 A | 5/1991 | Watt | 137/615 |
| 5,358,006 A | 10/1994 | Sweers | 137/615 |
| 5,358,007 A | 10/1994 | Carlberg | 137/615 |
| 5,452,743 A | 9/1995 | Rortvedt | 137/615 |
| 5,522,427 A | 6/1996 | Johnson | 137/616.5 |
| 5,673,519 A | 10/1997 | McCaughan | 52/16 |
| 5,735,085 A | 4/1998 | Denooy | 52/16 |
| 6,240,680 B1 | 6/2001 | Estes | 52/16 |
| 6,647,670 B1 | * 11/2003 | Dran | 52/16 |

FOREIGN PATENT DOCUMENTS

| | | | |
|---|---|---|---|
| CA | 2163469 A1 | * | 5/1997 |
| CH | 657 887 A5 | * | 9/1986 |
| DE | 27 51 471 B1 | * | 4/1979 |

OTHER PUBLICATIONS

Whatever Works website, http://www.whateverworks.com/automatic_downspout.htm, created Oct. 18, 2000.*

* cited by examiner

*Primary Examiner*—Ramon O. Ramirez
*Assistant Examiner*—Jon Szumny
(74) *Attorney, Agent, or Firm*—Michael S. Neustel

(57) ABSTRACT

An automatic downspout system for automatically extending a downspout during periods of precipitation and retracting the downspout during periods of no precipitation. The automatic downspout system includes an upper tube, a lower tube having a lower reservoir, wherein the lower tube is slidably positioned about a lower end of the upper tube, a lower opening and a side opening within the lower tube, a downspout member pivotally attached to the lower tube, and a ballasting structure connected to the lower tube and the downspout member for extending the downspout member when the lower tube is lowered.

20 Claims, 4 Drawing Sheets

AUTOMATIC DOWNSPOUT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to rain gutter downspouts and more specifically it relates to an automatic downspout system for automatically extending a downspout during periods of precipitation and retracting the downspout during periods of no precipitation.

2. Deescription of the Related Art

Downspouts for rain gutters have been in use for years. A conventional ownspout has a vertical portion extending downwardly from the rain gutter with a lower portion pivotally extending at an angle from the lower end of the vertical portion. A locking loop structure is attached to the vertical portion for selectively securing the lower portion in a vertical and parallel manner to the vertical portion when it is desirable to have the lower portion removed.

The main problem with conventional downspouts is that they require the user to manually lower and raise them as desired. A further problem with conventional downspouts is that they are often times left down which is a hazard and a nuisance. Another problem with conventional downspouts is that they are sometimes left in the upright retracted position which causes rain water to flow directly to the ground adjacent the building structure. Another problem with conventional downspouts is that they are obstructive to common activities around a building such as mowing. A further problem with conventional downspouts is that they are often times damaged after being accidentally engaged in the extended position.

Examples of patented devices which may be related to the present invention include U.S. Pat. No. 5,522,427 to Johnson; U.S. Pat. No. 5,673,519 to McCaughan; U.S. Pat. No. 3,375,851 to Henry et al; U.S. Pat. No. 5,452,743 to Rortvedt; U.S. Pat. No. 5,735,085 to Denooy; U.S. Pat. No. 6,240,680 to Estes; U.S. Pat. No. 5,358,007 to Carlberg; U.S. Pat. No. 5,358,006 to Sweers; U.S. Pat. No. 5,014,745 to Watt; U.S. Pat. No. 4,270,572 to Jarzynka; U.S. Pat. No. 3,911,954 to Johnson; U.S. Pat. No. 3,060,952 to Bystrom; and U.S. Pat. No. 3,316,928 to Weakley.

While these devices may be suitable for the particular purpose to which they address, they are not as suitable for automatically extending a downspout during periods of precipitation and retracting the downspout during periods of no precipitation. Conventional downspouts require the user to manually lower and raise the downspout.

In these respects, the automatic downspout system according to the present invention substantially departs from the conventional concepts and designs of the prior art, and in so doing provides an apparatus primarily developed for the purpose of automatically extending a downspout during periods of precipitation and retracting the downspout during periods of no precipitation.

BRIEF SUMMARY OF THE INVENTION

In view of the foregoing disadvantages inherent in the known types of downspouts now present in the prior art, the present invention provides a new automatic downspout system construction wherein the same can be utilized for automatically extending a downspout during periods of precipitation and retracting the downspout during periods of no precipitation.

The general purpose of the present invention, which will be described subsequently in greater detail, is to provide a new automatic downspout system that has many of the advantages of the downspouts mentioned heretofore and many novel features that result in a new automatic downspout system which is not anticipated, rendered obvious, suggested, or even implied by any of the prior art downspouts, either alone or in any combination thereof.

To attain this, the present invention generally comprises an upper tube, a lower tube having a lower reservoir, wherein the lower tube is slidably positioned about a lower end of the upper tube, a lower opening and a side opening within the lower tube, a downspout member pivotally attached to the lower tube, and a ballasting structure connected to the lower tube and the downspout member for extending the downspout member when the lower tube is lowered.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an automatic downspout system that will overcome the shortcomings of the prior art devices.

A second object is to provide an automatic downspout system for automatically extending a downspout during periods of precipitation and retracting the downspout during periods of no precipitation.

Another object is to provide an automatic downspout system that reduces the likelihood of physical injury to individuals because of an extended downspout.

An additional object is to provide an automatic downspout system that reduces the likelihood of damage to the downspout.

A further object is to provide an automatic downspout system that ensures that water is properly diverted away from a building structure during periods of precipitation.

Another object is to provide an automatic downspout system that does not require the user to manually operate the downspout.

A further object is to provide an automatic downspout system that does not utilize an actuator device.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
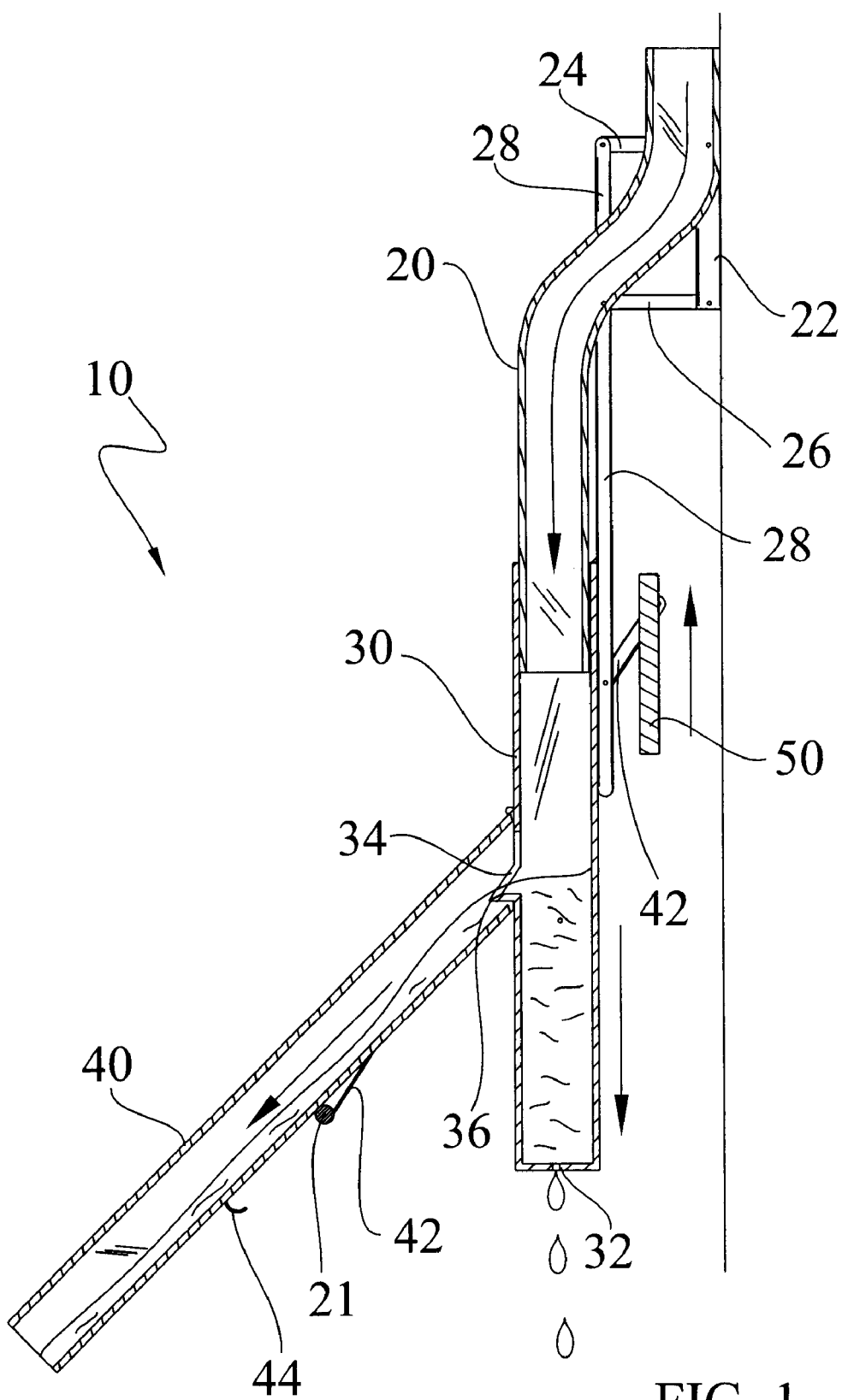
FIG. 1 is side cutaway view of the present invention in the extended position.

Turning now descriptively to the drawings, in which similar reference characters denote similar elements throughout the several views, FIGS. 1 through 5 illustrate an automatic downspout system 10, which comprises an upper tube 20, a lower tube 30 having a lower reservoir, wherein the lower tube 30 is slidably positioned about a lower end of the upper tube 20, a lower opening 32 and a side opening 34 within the lower tube 30, a downspout member 40 pivotally attached to the lower tube 30, and a ballasting structure connected to the lower tube 30 and the downspout member 40 for extending the downspout member 40 when the lower tube 30 is lowered.

The upper tube 20 has an upper end that is fluidly connected to the rain gutter preferably in a non-movable manner. The upper tube 20 preferably angles outwardly a finite distance though various other structures may be utilized as best illustrated in FIG. 1 of the drawings. The upper tube 20 may be comprised of an enclosed tubular structure with an open upper end and an open lower end. The upper tube 20 may also be comprised of a partially enclosed structure such as but not limited to a U-shaped structure.

Figure 5:
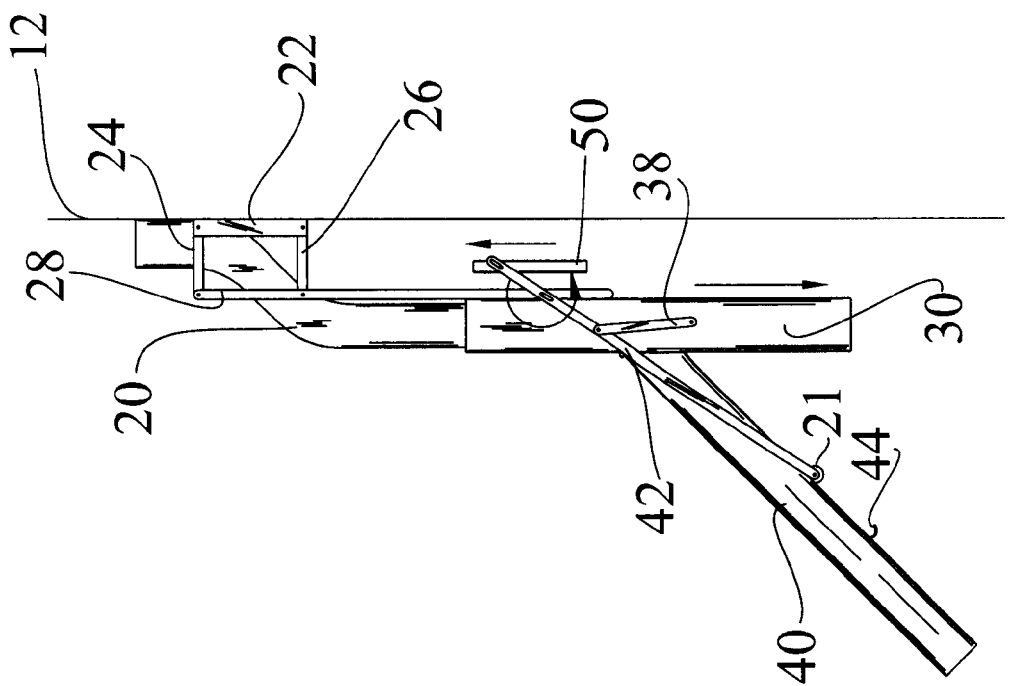
FIG. 5 is a side view of the present invention attached to a building structure in the extended position.
Figure 4:
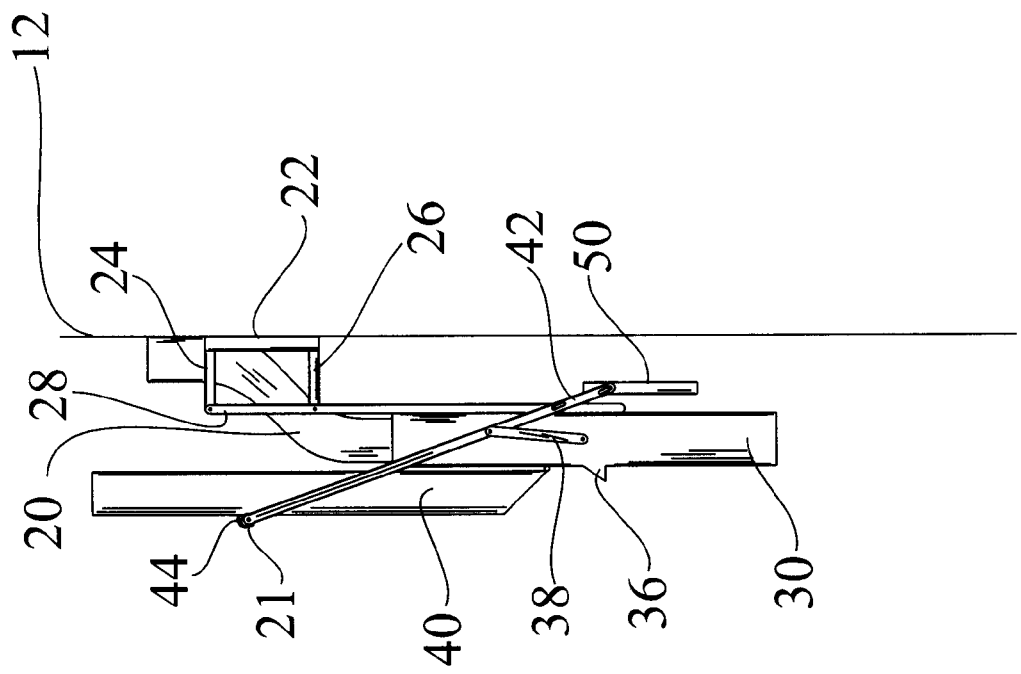
FIG. 4 is a side view of the present invention attached to a building structure in the retracted position.

The lower tube 30 is comprised of an elongate structure as best illustrated in FIGS. 1, 4 and 5 of the drawings. The lower tube 30 has an open upper end which is slidably positioned either about or within the lower open end of the upper tube 20 as best illustrated in FIG. 1 of the drawings.

The lower tube 30 has a substantially enclosed lower portion thereby forming a lower reservoir for receiving and collecting precipitation distributed through the rain gutter. The lower portion of the lower tube 30 is preferably closed by a floor or similar structure. The lower portion includes at least one lower opening 32 for allowing water accumulated within the lower reservoir to escape over a period of time. The lower opening 32 is preferably within the lower enclosed end of the lower tube 30, however the lower opening 32 may extend into the side of the lower tube 30 near the lower enclosed end.

A side opening 34 extends into the lower tube 30 a finite distance for allowing water to overflow from the lower reservoir within the lower tube 30 out from the lower tube 30. A lip portion 36 preferably extends from a lower part of the side opening 34 for directing the overflow water out from the side opening 34.

A downspout member 40 is an elongate structure having a first open end and a second open end. The downspout member 40 may have an enclosed or partially enclosed tubular structure. The first open end of the downspout member 40 is pivotally attached to the lower tube 30 near the side opening 34 as best illustrated in FIG. 1 of the drawings.

Figure 2:
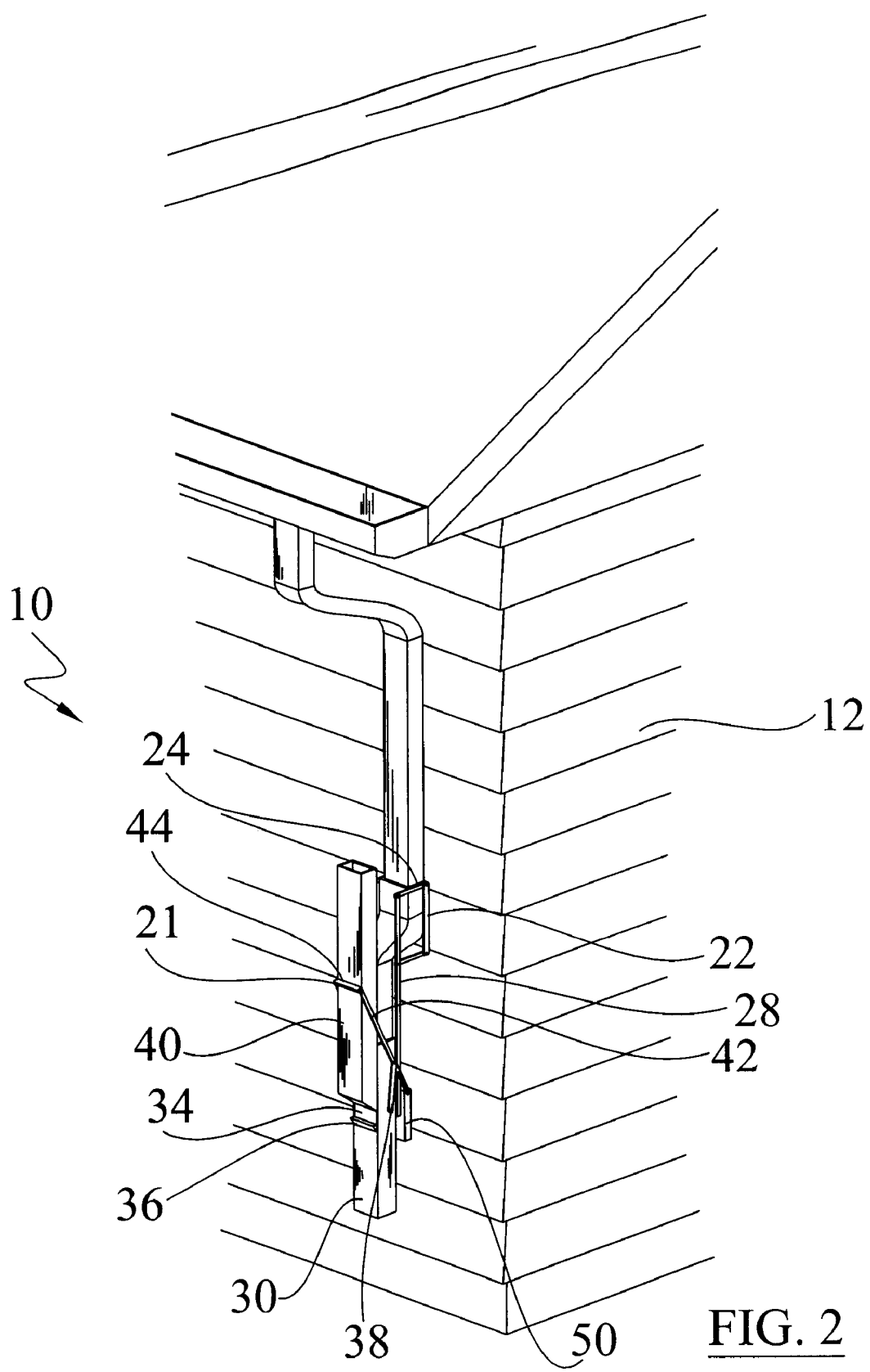
FIG. 2 is an upper perspective view of the present invention attached to a building structure in the retracted position.
Figure 3:
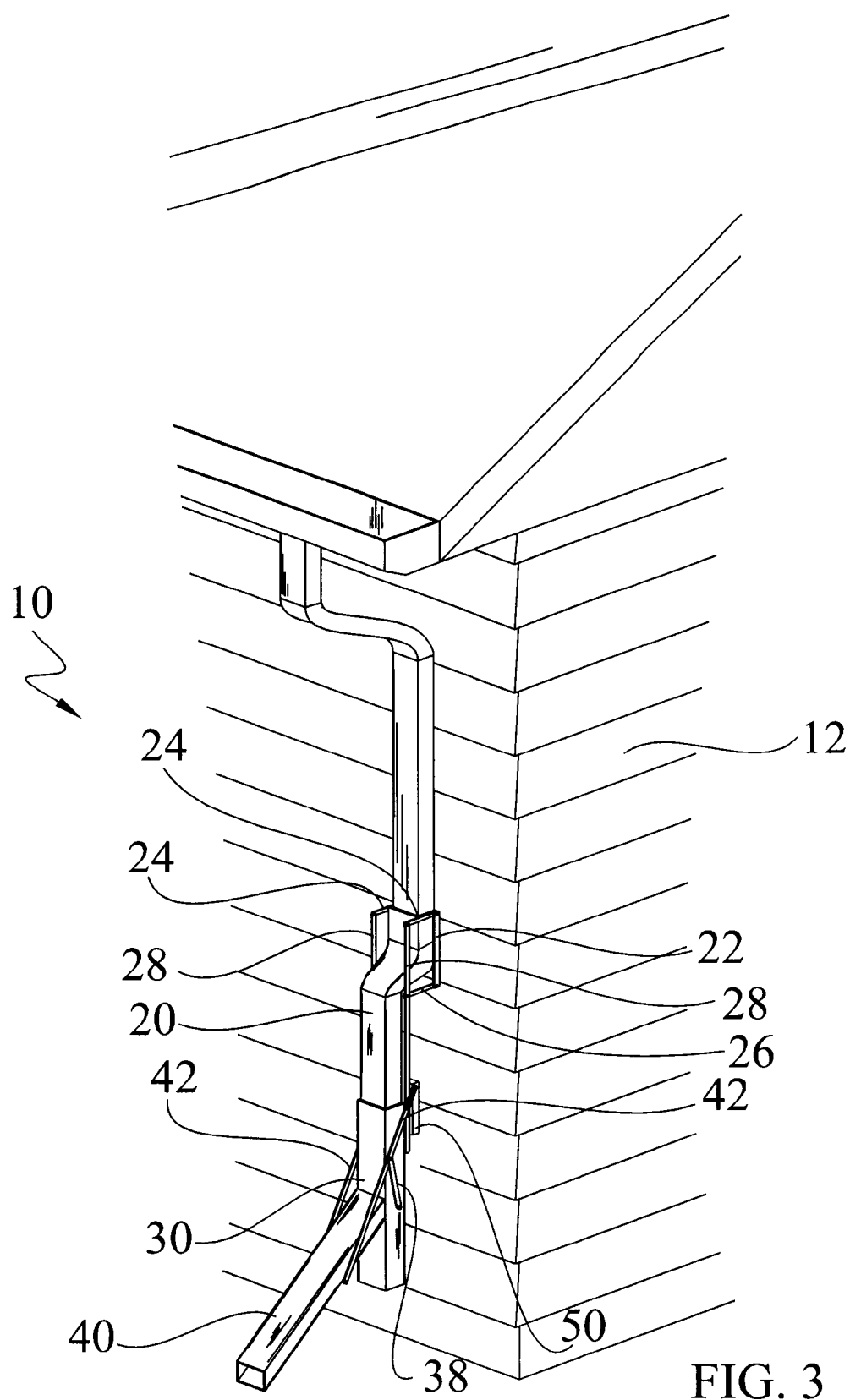
FIG. 3 is an upper perspective view of the present invention attached to a building structure in the extended position.

The first open end of the downspout member 40 is preferably angled for fitting snugly against the outer surface of the lower tube 30 when in the extended position as shown in FIGS. 1, 3 and 5 of the drawings. The first open end of the downspout member 40 is preferably pivotally attached at an upper portion thereof for allowing the downspout member 40 to pivot with respect to the lower tube 30 in a substantially vertical and parallel manner when in the retracted position as shown in FIGS. 2 and 4 of the drawings.

As best shown in FIGS. 4 and 5 of the drawings, at least one brace member 22 is attachable to a wall 12 of a building structure. At least one upper arm 24 and at least one lower arm 26 extend from the brace member 22 as shown in FIGS. 1 through 5 of the drawings. At least one first member 28 having an elongate structure is attached to both the upper arm 24 and the lower. arm 26. The first member 28 extends substantially downwardly and is pivotally connected to and supporting a corresponding support arm 42.

A ballast member 50 is attached to a distal end of the support arm 42 for applying a rotational force to the support arm 42 about the first member 28 pivot location as best illustrated in FIG. 4 and 5 of the drawings. The ballast member 50 may be comprised of any size, structure and material having sufficient weight to elevate both the lower tube 30 and the downspout member 40. The support arm 42 is connected to the lower tube 30 by a side arm 38 as best illustrated in FIGS. 2 through 5 of the drawings. The support arm 42 continues and engages the downspout member 40 in a slidable and supporting manner.

A guide member 21 comprised of a roller or similar structure preferably extends from the distal portion of the support arm 42 for elevating and lowering the downspout member 40. If more than one support arm 42 is utilized, the guide member 21 preferably extends between the support arms 42 for engaging a lower surface of the downspout member 40. A hook member 44 or other stopper structure is preferably attached to the lower surface of the downspout members 40 for stopping the movement of the guide member 21 when the downspout member 40 is in a substantially vertical position as shown in FIGS. 2 and 4 of the drawings.

In use, the automatic downspout system 10 is normally in the retracted position as shown in FIGS. 2 and 4 of the drawings. In the retracted position, the ballast member 50 provides a rotational force about the pivot point of the support arm 42 and the first member 28 for elevating both the downspout member 40 and the lower tube 30. When precipitation such as rain is accumulated within the rain gutter of the building structure, the water is then directed downwardly into the upper tube 20 and then to the lower tube 30. The water begins to fill the lower reservoir within the lower tube 30 thereby counterbalancing the ballast member 50 with the volume of water accumulated therein. Once the combination of the rotational force of water within the lower reservoir of the lower tube 30, the lower tube 30 and the downspout become greater than the rotational force created by the ballast member 50, the lower tube 30 begins to lower along with the downspout member 40. This process continues until the downspout member 40 is fully extended with the second open end engaging the ground surface or engaging the lower tube 30 as shown in FIGS. 1, 3 and 5 of the drawings. The water continues to fill the lower reservoir of the lower tube 30 until at a level equal to or lower than the side opening 34. The water then begins to flow outwardly from the side opening 34 into the downspout member 40 where the water is redirected away from the building structure.

When the water flow is terminated from the rain gutter, the water level within the lower tube 30 begins to lower as the water escapes through the lower opening 32 within thereof. Once the combination of the rotational force of water within the lower reservoir of the lower tube 30, the lower tube 30 and the downspout become less than the rotational force created by the ballast member 50, the lower tube 30 begins to rise upwardly along with the downspout member 40. This process continues until the guide member 21 engages the hook member 44 and/or the downspout member 40 is substantially vertical as best illustrated in FIGS. 2 and 4 of the drawings. The entire process for retracting the present invention may take between 10 seconds and 3 hours depending upon the size of the lower opening 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An automatic downspout system, comprising:
    an upper tube;
    a lower tube slidably positioned upon a lower end of said upper tube, wherein said lower tube has a lower reservoir and a side opening;
    a downspout member pivotally attached to said lower tube for selectively enclosing said side opening when in an extended position and for extending substantially vertically when in a retracted position;
    a support arm connected to said lower tube, wherein said support arm has a first end and a second end and wherein said second end movably engages said downspout member;
    a first member attachable to a wall, wherein said first member pivotally supports said support arm; and
    a ballast member attached to said first end of said support arm.

2. The automatic downspout system of claim 1, wherein said lower reservoir includes a lower opening for allowing water accumulated within said lower reservoir to drain out.

3. The automatic downspout system of claim 2, wherein said lower opening is sized so that said water within said lower reservoir is not completely drained until after a period of time exceeding approximately 10 seconds.

4. The automatic downspout system of claim 1, wherein said side opening includes a lip portion.

5. The automatic downspout system of claim 1, including a guide member attached to said second end of said support arm for slidably engaging a lower surface of said downspout member.

6. The automatic downspout system of claim 5, wherein said guide member is comprised of a roller.

7. The automatic downspout system of claim 1, wherein said first member is attachable to a wall by a brace member, an upper arm and a lower arm extending from said brace member for connecting to said first member.

8. The automatic downspout system of claim 1, wherein said downspout member has a first open end that is angled to fit against an outer surface of said lower tube when in said extended position.

9. The automatic downspout system of claim 1, wherein said support arm is connected to said lower tube by a side arm.

10. The automatic downspout system of claim 1, wherein said lower tube is comprised of an enclosed tubular structure.

11. An automatic downspout system, comprising:
    an upper tube having a first vertical segment, a curved segment extending outwardly and a second vertical segment opposite of said first vertical segment;
    a lower tube slidably positioned upon a lower end of said second vertical segment of said upper tube, wherein said lower tube has a lower reservoir and a side opening;
    a downspout member pivotally attached to said lower tube for selectively enclosing said side opening when in an extended position and for extending substantially vertically when in a retracted position;
    a support arm connected to said lower tube, wherein said support arm has a first end and a second end and wherein said second end movably engages said downspout member;
    a first member attachable to a wall, wherein said first member pivotally supports said support arm; and
    a ballast member attached to said first end of said support arm.

12. The automatic downspout system of claim 11, wherein said lower reservoir includes a lower opening for allowing water accumulated within said lower reservoir to drain out.

13. The automatic downspout system of claim 12, wherein said lower opening is sized so that said water within said lower reservoir is not completely drained until after a period of time exceeding approximately 10 seconds.

14. The automatic downspout system of claim 11, wherein said side opening includes a lip portion.

15. The automatic downspout system of claim 11, including a guide member attached to said second end of said support arm for slidably engaging a lower surface of said downspout member.

16. The automatic downspout system of claim 15, wherein said guide member is comprised of a roller.

17. The automatic downspout system of claim 11, wherein said first member is attachable to a wall by a brace member, an upper arm and a lower arm extending from said brace member for connecting to said first member.

18. The automatic downspout system of claim 11, wherein said downspout member has a first open end that is angled to fit against an outer surface of said lower tube when in said extended position.

19. The automatic downspout system of claim 11, wherein said support arm is connected to said lower tube by a side arm.

20. The automatic downspout system of claim 11, wherein said lower tube is comprised of an enclosed tubular structure.

* * * * *